United States Patent [19]

Keddie

[11] 4,455,908

[45] Jun. 26, 1984

[54] MITER SAW GUIDES

[75] Inventor: Burton G. Keddie, Elm Grove, Wis.

[73] Assignee: Hempe Manufacturing Company, Inc., New Berlin, Wis.

[21] Appl. No.: 352,966

[22] Filed: Feb. 26, 1982

[51] Int. Cl.³ .............................................. B27G 5/02
[52] U.S. Cl. ...................................... 83/767; 83/825
[58] Field of Search ................. 83/762, 763, 764, 765, 83/766, 767, 821, 822, 823, 824, 825, 826, 827, 828, 829; 384/152; 308/6 R, DIG. 7

[56] References Cited

U.S. PATENT DOCUMENTS

| | | | |
|---|---|---|---|
| 577,227 | 2/1897 | Bolig | 83/766 |
| 1,332,713 | 3/1920 | D'Arcy | 83/767 |
| 1,332,714 | 3/1920 | D'Arcy et al. | 83/767 |
| 2,912,019 | 11/1959 | Hempe | 83/767 |
| 2,912,288 | 10/1957 | Griswold | 308/DIG. 7 |
| 3,464,744 | 9/1969 | Fall | 308/6 R |

FOREIGN PATENT DOCUMENTS 562339 10/1932 Fed. Rep. of Germany ........ 83/825

Primary Examiner—James M. Meister
Assistant Examiner—J. L. Knoble
Attorney, Agent, or Firm—Fuller, House & Hohenfeldt

[57] ABSTRACT

Pairs of parallel rods spaced from each other along the path of miter saw movement for the saw to pass between them. At least one roller is mounted on each rod in a pair. The rollers have a plurality of axially spaced apart annular grooves that are occupied by resilient or elastomeric rings such that corresponding rings on one roller are in tangential contact, or nearly so, with the rings on the other. The rings yield when a saw blade is inserted between them to maintain opposing forces on the sides of the blade for constraining it to move in a single plane.

2 Claims, 4 Drawing Figures

U.S. Patent   Jun. 26, 1984   4,455,908
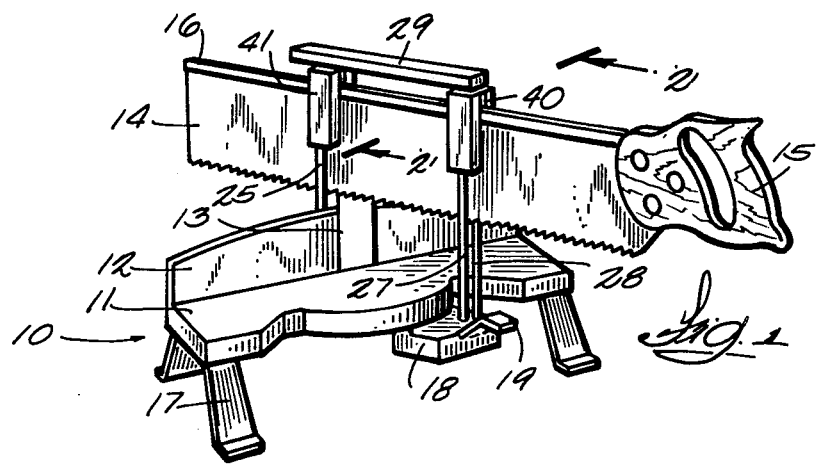
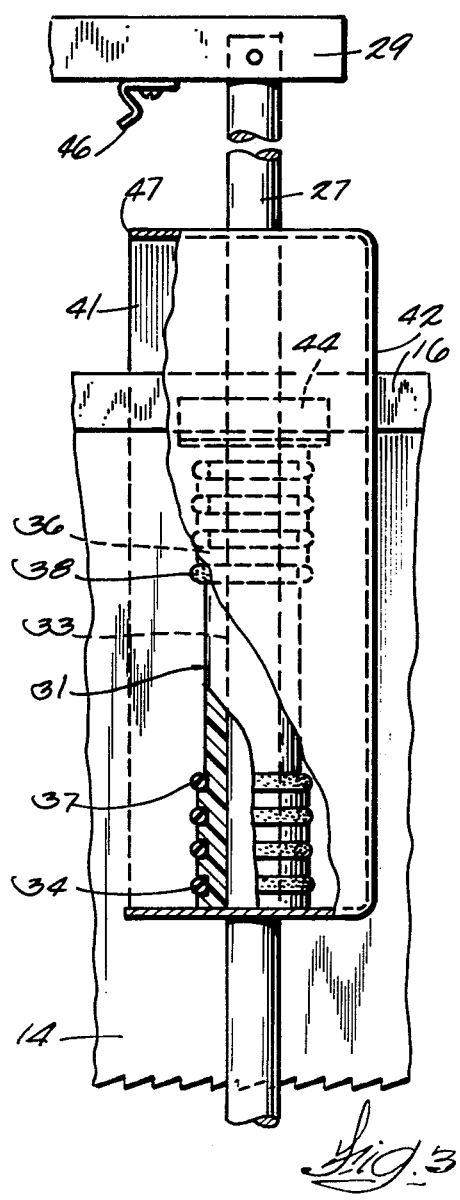
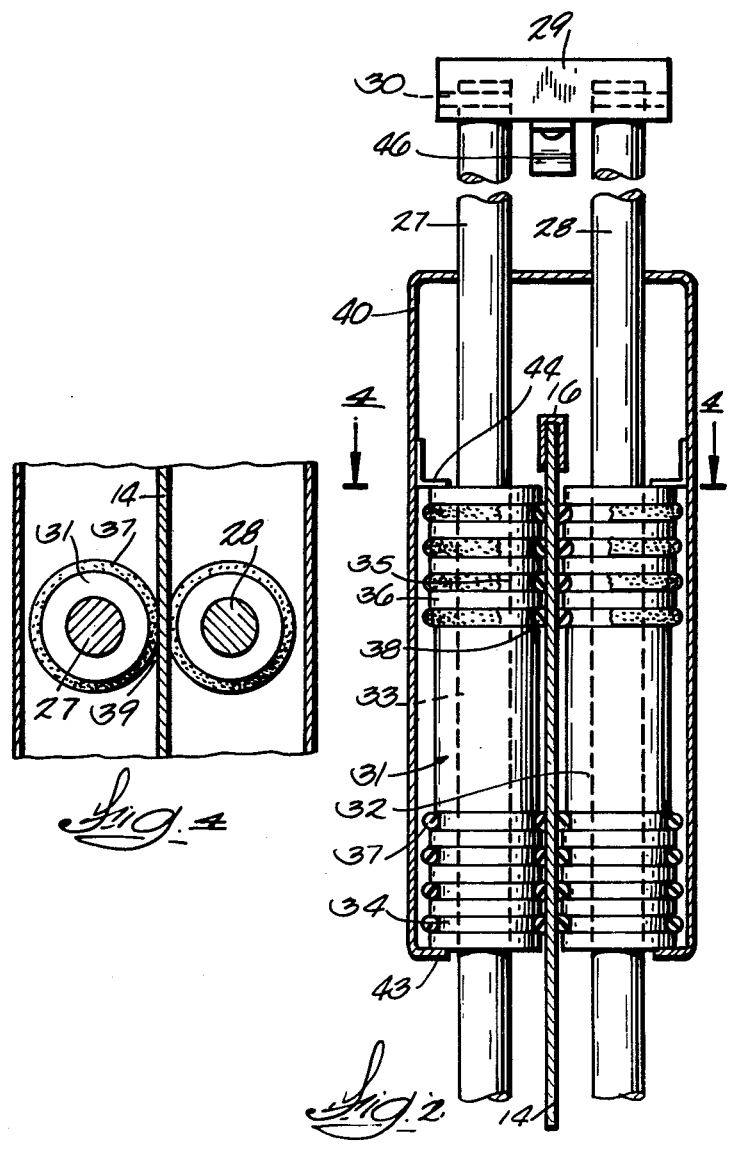

MITER SAW GUIDES

BACKGROUND OF THE INVENTION

This invention relates to improvements in miter saw apparatus.

An important feature of the improved mitering apparatus resides in its novel saw guides which are self-adjusting to receive saws of different thicknesses and to guide such saws with accuracy.

As is well known to woodworking craftsmen, the most rudimentary type of miter box comprises a wooden base on which there are parallel walls that have aligned angular slots for maintaining a saw at a predetermined angle with respect to a workpiece that rests on the bottom of the box. The slots serve as the sole means for guiding the saw continuously along the same path during stroke after stroke. The slots must necessarily be a little wider than the thickness of the saw blade to minimize binding of the saw. The substantial tolerance between the width of the slots and the thickness of the saw blade results in the blade being capable of changing its alignment slightly from stroke to stroke which is undesirable.

In more expensive high precision mitering apparatus designs, the saw is frequently guided between longitudinally spaced apart pairs of steel rollers. The rollers in each pair are spaced apart laterally to form a small gap through which the saw blade is inserted for guidance while being moved back and forth to perform a sawing operation. One saw blade may be slightly thicker or thinner than another in which case the saw blade may not fit through the gap, or it may fit too tightly, or may fit too loosely, at the expense of guidance accuracy. Hence, in some mitering apparatus, means are provided for adjusting the gap between the guide rollers to accommodate saws of different thicknesses. Providing adjusting means for the roller gaps in miter saw apparatus increases the complexity and cost of manufacturing the apparatus. Morever, time is required for the user to make the adjustment.

SUMMARY OF THE INVENTION

An object of the present invention is to provide guide means for a miter saw that overcomes the above-cited disadvantages and has the capability of adjusting to and compensating for various sawblade thicknesses without requiring any adjusting mechanism.

In accordance with the invention, the miter saw is movable back and forth between pairs of spaced apart parallel shafts or rods to perform a sawing operation. The rods have rollers journaled on them for rotation about vertical axes. The rollers are preferably provided with several axially spaced apart annular grooves in the illustrated embodiment. The grooves are occupied by bands or rings of an elastomeric material such as a plastic or natural or synthetic rubber. If a saw blade has not been inserted between the rollers, the rings on one roller are in tangential contact with each other. When a saw blade is inserted, the rings deform slightly or flatten where they interface with the sides of the saw to thereby maintain distributed opposing forces on opposite sides of the saw which prevents the saw blade from rocking to the right and left as it is moved back and forth. By having two such pairs of rollers with tangentially contacting peripheries spaced longitudinally from each other, the saw blade is constrained to stay in a fixed longitudinal path. Because of the resiliency of the rings, saw blades of a wide range of thicknesses can be accommodated between them. The inherent resiliency of the rings results in generating enough frictional force between them and the saw blade to cause the rollers to turn as the saw blade is moved back and forth.

An illustrative embodiment of the new saw guide means will now be described in detail in reference to the drawing.

DESCRIPTION OF THE DRAWING

FIG. 1 is a perspective view of a mitering machine which incorporates the new saw guide means and has the saw inserted in the guide means;

FIG. 2 is a fragmentary vertical section of one of the guide means taken along a plane corresponding to 2—2 in FIG 1;

FIG. 3 is a side elevation view of the guide means shown in FIG. 2, wherein some parts are in section and others are shown fragmentarily; and FIG. 4 is a horizontal section taken on a line corresponding with 4—4 in FIG. 2.

DESCRIPTION OF A PREFERRED EMBODIMENT

FIG. 1 shows mitering apparatus comprising a table that is generally designated by the numeral 10. The table has a flat top 11 and a back wall 12. As is well know, the workpiece or object to be sawed rests on the flat table top and is prevented from being pushed off during a sawing operation by the back wall 12. The back wall has a central slot 13 for the blade 14 of a saw to pass through during a sawing operation. A handle 15 is fastened to the saw blade. In this particular case, the saw blade is provided with a back rib 16 for stiffening it lengthwise. The table is supported on legs 17.

In this particular design, there is an arm 18 supported for pivoting in a horizontal plane about a vertical axis under table top 11. The arm is provided with a latch lever 19 that is pressed to effect release of the arm for swinging it. When the arm 18 is swung to the angle at which it is desired to dispose the saw blade with respect to the workpiece, the lever 19 is released and the arm is latched at the desired angle. Mitering apparatus having the features thus far described are well known.

In FIG. 1 there are two pairs of rods or shafts extending upwardly from arm 18 on opposite sides of the vertical swinging axis of the arm. In this figure, one rod 25 of one pair is visible and both rods 27 and 28 of the other typical pair are visible. The swinging axis of arm 18 lies approximately in the vertical plane of slot 13. Rod 25 and its parallel mate are part of the rear saw blade guide means and parallel rods 27 and 28 are part of the front saw blade guide means which are similar to the rear guide means. The upper ends of the pairs of rods are fastened in a longitudinally extending tie-bar 29 as shown in FIG. 1. U.S. Pat. No. 2,912,019 provides examples of using steel rollers on similar rods to guide the saw blade and of roller adjusting means.

As shown in FIG. 2, pins such as the one marked 30 secure the upper ends of the rods 27 and 28 in the tie-bar 29. The lower ends of the rods, not visible in FIG. 2 or 3, may be similarly secured in swinging arm 18 or they can be provided with threaded ends and screwed into the arm. In accordance with the invention, there are a pair of novel guide rollers 31 and 32 mounted for rotation on shafts 27 and 28, respectively.

As shown in FIG. 2, rollers 31 and 32 are rotatable on parallel rods 27 and 28, respectively. The rollers are free to slide up and down on the rods. Typical roller 31 may be made of a metallic or non-metallic material. Nylon is a desirable material because it results in producing little frictional resistance where the axial bores 33 of the rollers rotate on shafts 27 and 28, for example.

Typical roller 31 has some annular grooves such as those marked 34 and 35 at axially opposite ends. The grooves are separated axially by full diameter portions of the rollers such as the one marked 36. The grooves in the upper set of four and in the lower set of four in the FIG. 2 example are occupied by rings of elastomeric material such as the one marked 37. These rings can be commercial synthetic or natural rubber o-rings, for example, they can be made of other materials such as silicone rubber or any plastic that restores to its original cross-sectional shape after being deformed by a radial force and that has an appropriate coefficient of friction relative to a smooth steel surface of a saw blade. O-rings are used in the illustrative and actual device because they are readily available commercially and they have been found to perform satisfactorily. The elastomeric rings need not be round in cross section as is true of o-rings in the illustrative embodiment. They may have square, rectangular, triangular or some other cross section if desired as long as they interface with the saw blade and can deform resiliently. They may be comprised of several axially spaced bands of elastomeric material or they may be a single band in the nature of an elastic tube in a single groove on the rollers. Hence, the term "rings" as used herein is intended to encompass all such configurations of an elastomeric material that surrounds the more rigid guide rollers for the saw.

In FIG. 2, a miter saw blade 14 is inserted between rollers 31 and 32. Thus, as at the point marked 38, the peripheries of the resilient rings 37 deform or flatten where they interface with the sides of the saw blade. Before the saw blade is inserted, of course, the peripheries of the rings 37 at the same axial location on two adjacent rollers can be in tangential contact with each other or even separated by a small amount. In any case, insertion of a saw blade between the friction rings should cause them to deform sufficiently to generate enough frictional force to cause the rollers to rotate when the saw blade is moved back and forth between them. One may see in FIG. 4 how the rings 37 deform to effect frictional engagement with the saw blade in the region marked 39.

It will be understood, of course, that vertical rod 25 on one side of the saw blade and its counterpart on the other side in FIG. 1 will have rollers 31 and 32 journaled on them for rotating and sliding axially to provide a rear saw guide means similar to the front saw guide means which were just described in reference to FIG. 2. Since the front and rear saw guide means are spaced apart in the longitudinal direction of the saw blade and since the rollers have substantial axial length, the saw blade is constrained to move back and forth in a single perfectly vertical plane so that straight cuts can be made reproducibly in any workpiece that is supported on table top 11. In other words, the guide means prohibit the saw from tilting to the left or right and from shifting out of a single vertical plane while at the same time permitting the saw blade to pitch or angulate upwardly and downwardly as the blade progresses through the workpiece.

As can be seen in FIGS. 1-3, housing members 40 and 41 are adapted to slide on each pair of vertical shafts or rods in the particular mitering apparatus that is used to illustrate the new guide rollers. A vertical section through typical housing member 40 is shown in FIG. 2 and a side view with a part of the housing broken away is shown in FIG. 3. The housing has an open back 41 and a slot 42 which allow saw blade 14 to pass through the housing. As shown in FIG. 2, the lower inwardly turned end 43 of the housing provides support for the lowers. A pair of flanged elements 44 are fastened to the inside of housing 40 in which case the rollers are captured between the flanged elements and the inwardly bent end 43 of the housing. Thus, it will be evident that if the housing is moved up or down, the rollers move correspondingly with the housing.

S-shaped flat spring 46 is fastened to the bottom of tie bar 29. To provide for inserting the miter saw 14 as in FIG. 1 and keeping it suspended from the work table 11 so that the workpiece can be inserted without interference by the saw blade, it is only necessary to lift housing 40 until its upper edge 47, see FIG. 3, becomes engaged by s-shaped flat spring 46. This may be done before the saw blade is inserted. In any case, after the saw blade is inserted between the pairs of aligned elastomeric ring containing rollers, and when the workpiece is in position on the table and ready for sawing, a small downward force on the saw will unlatch housings 40 and 41 from springs 46 so the saw blade can descend freely through the workpiece as the sawing operation proceeds.

Now that the concept of using guide rollers having resilient peripheries to accommodate saw blades that have different thicknesses without requiring any adjustment by the user has been disclosed in a particular embodiment, those skilled in the art should have no difficulty in incorporating the concept in various miter saw designs.

I claim:

1. Mitering saw apparatus comprising:
   a table for supporting a workpiece that is to be sawed,
   an arm mounted to said table for swinging about a vertical axis in a horizontal plane,
   first and second pairs of shafts mounted to said arm in longitudinally spaced apart relationship, the shafts in each pair being parallel to each other and disposed, respectively, at equal distances from and on opposite sides of the plane in which a saw is to be moved to cut a workpiece on said table,
   a roller on each shaft in a pair, each roller having a plurality of axially spaced apart annular grooves and resilient rings having circular cross sections disposed in said grooves and extending radially outwardly from the grooves, the outer peripheries of the rings on one roller in a cooperating pair being substantially in tangential point contact with corresponding rings in the other roller of the pair, such that when any saw blade within a predetermined range of thicknesses is inserted between the rings on the rollers in a pair the peripheries of the rings deform uniformly to make contact with the blade over an area slightly greater than a point and apply opposing forces to opposite sides of the saw blade to thereby guide the blade.

2. The apparatus as claimed in claim 1 wherein said rollers are composed of nylon.

* * * * *